Patented Sept. 1, 1925.

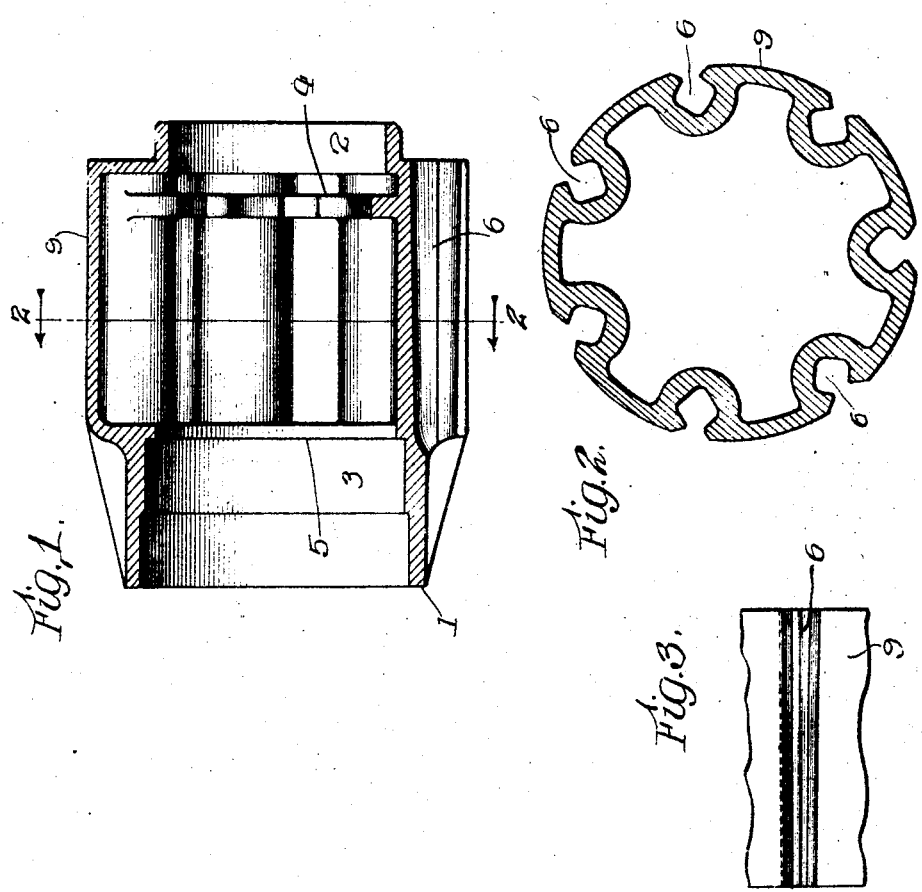

1,552,102

UNITED STATES PATENT OFFICE.

WILLIAM ERASTUS WILLIAMS, OF CHICAGO, ILLINOIS.

CAST-METAL-WHEEL HUB.

Application filed October 2, 1919. Serial No. 328,052.

*To all whom it may concern:*

Be it known that I, WILLIAM ERASTUS WILLIAMS, a citizen of the United States, a resident of Chicago, in the county of Cook and State of Illinois, have invented a new and useful Improvement in Cast-Metal-Wheel Hubs, of which the following is a specification.

My invention relates to castings that are to be used in connection with other parts that are to be fitted thereto.

The object of this invention is to produce a very simple cast metal hub body having peripheral spoke-receiving longitudinal grooves having non-machined, interior surfaces which without accurate measurements are invariable in form and spacing.

In the accompanying drawings,

Fig. 1 is an axial section of the hub body.

Fig. 2 is a section on the line 2—2, Fig. 1.

Fig. 3 is a view in the direction indicated by the arrow of Fig. 2.

In these views, 1 represents a tubular cast metal hub body having a ball bearing seat 2 with shoulder projections 4, and a bearing seat 3 with a flange abutment 5. The middle portion of the body 1 has longitudinal tapered and spaced peripheral grooves or pockets 6, parallel to the hub's axis, open outwardly at one end and of substantially square cross-section. The grooves are accurately spaced and have smooth, non-machined internal surfaces which require no exact measurements in finishing but are invariable in form and so smooth and hard that spokes may be readily forced home in them.

What I claim is:

1. A cast wheel-hub body of sleeve-like form having, substantially parallel to its axis, peripheral grooves open outwardly and at one end to receive, respectively, spokes sliding into the grooves from the end of the latter, the said grooves being substantially square in form with one diagonal substantially at right angles to a radius of said hub body.

2. A one-piece cast metal hub body having a tubular middle portion provided with peripheral, outwardly and terminally open grooves which are longitudinally tapered and approximately parallel to the hub's axis.

3. A one-piece cast hub body of tubular form provided with longitudinal, tapered, peripheral grooves open outwardly and at one end and having two opposite, smooth, non-machined surfaces and adapted to have closely fitting spokes forced longitudinally and without abrasion into the converging spaces between the pairs of said surfaces.

Signed at Chicago, in the county of Cook and State of Illinois, this twenty-sixth day of September, 1919.

WILLIAM ERASTUS WILLIAMS.